3,051,678
SCRATCH MASKING COATING COMPOSITION FOR MASONRY COMPRISING A POLYESTER RESIN, SAND AND MINERAL OIL
Itzhak Bentov, Cambridge, Mass., assignor to W. R. Grace & Co., Cambridge, Mass., a corporation of Connecticut
No Drawing. Filed Nov. 24, 1958, Ser. No. 775,736
1 Claim. (Cl. 260—33.6)

This invention relates to the masking of scratches on surfaces. More particularly this invention relates to novel compositions containing a scratch masking component.

It has become quite conventional to apply surface coatings to building units to produce a decorative finish thereon. The exposed areas of many of these surface coatings exhibit a satin smooth glazed finish which is very attractive. The glazing material utilized in the structure of these surfaces usually comprises a thermosetting or thermoplastic resinous binder combined with glass silica sand and other material. Generally pigments, colored granules, or both may be used to add color and decorative character to these facings. These surfaces are generally smooth and impervious. Some of them have been found to be resistant to spotting, staining and soiling. Others have been found to be resistant to changes due to variations in temperature and changes due to color degradation by light. Even though these surfaces exhibit all of the aforesaid attributes they still have one fault in common, i.e. they are not scratch resistant.

A surface scratch may be characterized as a shallow mark, furrow, groove, and even a channel. A scratch may be placed in the aforedescribed surfaces merely by applying a relatively sharp instrument to such surfaces and applying pressure thereto. It is apparent that almost anyone can mar the surfaces of these exquisite finishes by simply utilizing an instrument such as a knife and a slight degree of pressure.

In all finishes of the aforedescribed type a scratch will be visually apparent. This is due to the fact that the refractive index of the bed of the shallow mark is substantially different from the refractive index of the surface of the coating unit. For instance, a knife mark would appear as a white line on the finish of these colored surfaces. It may be seen that such a mark could easily destroy the attractiveness of this surface. In cases where this surface is part of a decorative scheme the entire aesthetic effect could be altered. Even though these surfaces contain scratches, if the refractive indexes of these scratches were not substantially different, i.e. to any appreciable degree, in comparison to the refractive index of these smooth surfaces then such scratches would be less apparent visually.

We have discovered that a surface coating may be especially composed so that a scratch mark on its surface would not be too apparent. It has further been found that to a large degree such a mark will even become visually non-discernible in a comparatively short space of time. In some cases this period of time has been found to be as little as 24 hours. The basis of this discovery, in brief, is the restoration of the refractive index of such mark to a level in close proximity to the initial refractive index of the surface itself.

In general, the present invention comprises the incorporation of a lubricating type component into the conventional coating compositions. This lubricating component imparts a scratch masking character to surfaces made from these compositions. In the preferred embodiment this lubricating type component may be either a silicone fluid or mineral oil type lubricant. It has been found that a silicone fluid or mineral oil having the following characteristics may be used. This lubricating material should have a specific gravity of between about 0.7 and about 0.9 at about 60° F. and a viscosity of between about 35 Saybolt Universal seconds and about 5000 Saybolt Universal seconds at about room temperature. Of major importance is the fact that these lubricating components should not be appreciably soluble in the coating composition in which it is utilized. Further these components should maintain some of their fluidity even after the other components of such compositions have become solidified.

We have found that surfaces, produced from coating compositions in which a lubricating component is incorporated, possess a unique and novel scratch masking characteristic. When a scratch is produced in these surfaces it will not be appreciably apparent to the eye. Also with time this scratch mark will begin to fade until the mark is substantially non-discernible on the surface.

The concept which is felt to be the basis of this invention, but which this invention is not to be construed as limited to, is the inherent masking of scratches by the surface coating unit itself. For instance, the surface of the coating unit, as would appear to the eye, is most generally smooth. Minor imperfections may become apparent under microscopic examination, but it may be assumed that this surface is substantially as hard as the solids in the body of the coating unit. If a sharp steel instrument is contacted to this surface and a sufficient amount of pressure is applied thereto, the surface will become indented. If the steel instrument is a knife, then it will have shattered the sand particles and displaced the plastic binder of the coating. This shattering and displacement effect will result in a furrow being produced in the surface of such unit which will appear as a light dent upon the surface. This blemish would be more apparent if the point of this knife is drawn across the surface of this unit. The furrow of such groove will be lined with particles of steel which have been shaved from this knife by the abrasive action of the unit itself. The refractive index of the raised edges of the groove are now substantially different from the refractive index of the surface of the unit and the scratch will appear as a white line. In conventional coatings, this line might stand out as an extreme mar on the surface. However, due to the fact that a scratch masking component is incorporated in the solidified system, this line will not be as discernible in appearance in contrast to a scratch produced in the surface of a conventional coating. This masking effect is due to the fact that when this sharp instrument produces a scratch in the surface it also allows the release of the masking agent into the furrow or groove produced by this instrument.

The lubricating fluid squeezed out of the unit, by the pressure of the tool, will percolate into the channel of the scratch substantially filling the cracks in the sand particles and binder. When the lubricating fluid percolates into the channel it reduces the visible contrast between the scratch and the surface of the unit. The visible contrast is reduced because the refractive index of the scratch is restored to a level in close proximity to the refractive index of the surface of the unit. This action continues for a period until a point is reached at which the scratch is not too appreciably apparent. In some cases this period has been found to be as little as 24 hours. Another important factor in reducing the marring effect of the steel instrument is that this masking component lubricates the point of contact between the knife and the bottom of the groove. This results in the amount of friction between the scratching tool and the surface being minimized. When the amount of friction is minimized the abrasive action of the surface is reduced and the amount of metal shavings left on the surface will be negligible. Also the lubricant will incidentally act as a mold release agent for the finally shaped coating unit allowing it to be freely released from its shaping mold.

The following examples are by way of illustration and are not intended to be limitations upon the appended claim.

EXAMPLE I 4.0 grams of calcium carbonate was intimately mixed with 1.0 gram of mineral oil until the surface of the calcium carbonate was sufficiently wetted with such oil.

Subsequently 1.0 gram of methyl ethyl ketone peroxide catalyst, 1.0 gram of cobalt naphthenate, and 50 grams of a polyester resin (a condensation product of propylene glycol and dipropylene glycol with phthalic anhydride and maleic anhydride), were added to the aforesaid powdery mixture and this fluid mass was then agitated until it became relatively uniform. 20 grams of this mass was subsequently utilized in the process set forth in Procedure I.

Procedure I 50 grams of sand and 0.25 gram of blue pigment were charged into a 4" x 8" by ½" flat bottom mold. The mold was then manually vibrated to increase the density, decrease the void volume, and to level such sand mass in the mold.

A 4" x 8" non-woven cotton web fabric was placed on a portion of a 6" x 20" sheet of polyethylene. 20 grams of the aforesaid prepared resinous fluid mass were poured upon the non-woven cotton web fabric. The area of the polyethylene sheet which was not covered by the non-woven cotton web fabric was folded so that it lapped over the surface of the impregnated web. A rolling pin was applied to the upper surface of the folded polyethylene sheet and this pressure aided in distributing the resinous mass somewhat uniformly through the non-woven fabric.

At this stage, the resin impregnated non-woven web fabric was surmounted upon the upper surface of the flat surfaced sand mass. The positioning of the web in relation to the said mass was such that the web completely covered the upper surface of the said mass.

A ram, slightly less in dimensions of width and length as in comparison to the mold, was placed upon the upper surface of the surmounted web. The degree of clearance between the sides of the ram and the sides of the mold was about $\frac{1}{16}$ of an inch. The mold with its contents were placed upon the lower platen of a hydraulic platen press. The lower platen was raised until a force of about 10,000 pounds was applied to the ram. The temperature of the contents of the mold was raised to and maintained at 250° F. for about 15 minutes.

The temperature and pressure of the system were then allowed to return to normal, and the mold with its contents were removed from the press. Upon removing the surface cap from the mold it was found in condition to be applied to the face of an appropriate sized masonry building unit.

EXAMPLE II 10.0 grams of calcium carbonate was intimately mixed with 2.5 grams of mineral oil until the surface of the calcium carbonate was sufficiently wetted with such oil.

Subsequently 1.0 gram of methyl ethyl ketone peroxide catalyst, 2.5 grams of cobalt naphthenate, and 50 grams of polyester resin (a condensation product of propylene glycol and dipropylene glycol with phthalic anhydride) and 0.25 gram of blue pigment were added to the aforesaid powdery mixture. This fluid mass was then agitated until it became relatively uniform. 33 grams of this mass was subsequently utilized in the process set forth in Procedure II.

Procedure II 57 grams of sand were charged into a 4" x 8" x ½" flat bottom mold. The mold was then manually vibrated to increase the density, decrease the void volume, and to level such sand mass in the mold.

A 4" x 8" non-woven cotton web fabric was placed on a portion of a 6" x 20" sheet of polyethylene. 33 grams of resinous fluid mass, prepared according to Example II, were poured upon the non-woven cotton web fabric. The area of the polyethylene sheet which was not covered by the non-woven cotton web fabric was folded so that it lapped over the surface of the impregnated web. A rolling pin was applied to the upper surface of the folded polyethylene sheet and this pressure aided in distributing the resinous mass somewhat uniformly through the non-woven fabric.

At this stage, the resin impregnated non-woven web fabric was surmounted upon the upper surface of the sand mass. The positioning of the web in relation to the sand mass was such that the web completely covered the upper surface of the sand mass.

A ram, of slightly less dimensions in width and length in comparison to the mold, was placed upon the upper surface of the surmounted web. The degree of clearance between the sides of the ram and the sides of the mold was about $\frac{1}{16}$ of an inch. The mold with its contents were placed upon the lower platen of a hydraulic platen press. The lower platen was raised until a force of about 8,000 pounds was applied to the ram. The temperature of the contents of the mold was raised to and maintained at 270° F. for about 10 minutes.

The temperature and pressure of the system were then allowed to return to normal and the mold with its contents were removed from the press. Upon removing the surface cap from the mold it was found in condition to be applied to the face of an appropriate sized masonry building unit.

EXAMPLE III 50 grams of a polyester resin (a condensation product of propylene glycol and dipropylene glycol with phthalic anhydride and maleic anhydride), 15 grams of styrene monomer, 0.65 gram of methyl ethyl ketone peroxide catalyst and 0.32 gram of cobalt naphthenate were intimately mixed together until the fluid mass became relatively uniform. 22 grams of this mixture was subsequently utilized in the process set forth in Procedure III.

Procedure III 50 grams of sand, 0.5 gram of calcium carbonate, 0.5 gram of blue pigment, and 0.2 gram of mineral oil were charged into a 4" x 8" x ½" flat bottom mold. The mold was then manually vibrated to increase the density, decrease the void volume, and to level such sand mass in the mold.

A 4" x 8" non-woven cotton web fabric was placed on a portion of a 6" x 20" sheet of polyethylene. 22 grams of the resinous fluid mass, prepared according to Example III, were poured upon the non-woven cotton web fabric. The area of the polyethylene sheet which was not covered by the non-woven cotton wet fabric was folded so that it lapped over the surface of the resin impregnated web. A rolling pin was applied to the upper surface of the folded polyethylene sheet and this pressure aided in distributing the resinous mass somewhat uniformly through the non-woven fabric.

At this stage, the resin impregnated non-woven fabric was surmounted upon the upper surface of the shaped sand mass. The positioning of the web in relation to the sand mass was such that the web completely covered the upper surface of the sand mass.

A ram, of slightly less dimensions in width and length in comparison to the mold, was placed upon the upper surface of the surmounted web. The degree of clearance between the sides of the ram and the sides of the mold was about $\frac{1}{16}$ of an inch. The mold with its contents were placed upon the lower platen of a hydraulic platen press. The lower platen was raised until a force of about 10,000 pounds was applied to the ram, at which time the contents of the mold were subjected to a heat cycle in which a temperature of about 250° F. was applied for 15 minutes, followed by the application of heat in the range of 350° F. for 5 minutes.

The pressure of the system was allowed to return to normal and the mold with its contents were removed from the press. Upon removing the surface cap from the mold it was found in condition to be applied to the face of an appropriate sized masonry building unit.

EXAMPLE IV 1.0 gram of methyl ethyl ketone peroxide catalyst, 0.25 gram of cobalt naphthenate accelerator, 50 grams of a polyester resin (a condensation product of propylene glycol and dipropylene glycol with phthalic anhydride and maleic anhydride), and 6.5 grams of another polyester resin (a condensation product of ethylene glycol and diethylene glycol with phthalic anhydride, maleic anhydride, and adipic acid), were intimately mixed together until the fluid mass became relatively uniform. Subsequently 17 grams of this fluid mass was utilized in the process set forth in procedure IV.

*Procedure IV*

50 grams of sand, 3.0 grams of calcium carbonate, which has been wetted with about 0.37 gram of a mineral oil were charged into a 4" x 8" x ½" flat bottom mold. The mold was then manually vibrated to increase the density, decrease the void volume, and to level such sand mass in the mold.

A 4" x 8" non-woven cotton web fabric was placed on a portion of a 6" x 20" sheet of polyethylene. 17 grams of the resinous fluid mass, prepared according to Example IV, were poured upon the non-woven cotton web fabric. The area of the polyethylene sheet which was not covered by the non-woven cotton web fabric was folded so that it lapped over the surface of the resin impregnated web. A rolling pin was then applied to the upper surface of the folded polyethylene sheet and this pressure aided in distributing the resinous mass somewhat uniformly through the non-woven fabric.

At this stage, the resin impregnated non-woven web fabric was surmounted upon the upper surface of the leveled sand mass. The positioning of the web in relation to the sand mass was such that the web completely covered the upper surface of the sand mass.

A ram, of slightly less dimensions in width and length as in comparison to the mold, was placed upon the upper surface of the surmounted web. The degree of clearance between the sides of the ram and the sides of the mold was about ⅟₁₆ of an inch. The mold with its contents were placed upon the lower platen of a hydraulic platen press. The lower platen was raised until a force of about 8,000 pounds was applied to the ram. The temperature of the contents of the mold was then raised to and maintained at 250° F. for about 10 minutes.

The pressure of the system was allowed to return to normal and the mold with its contents were removed from the press. Upon removing the surface cap from the mold it was found in condition to be applied to the face of an appropriate sized masonry building unit.

It is apparent from the foregoing examples that the scratch masking component may be incorporated into the composition in a variety of ways. It will be noted that the amount of lubricant used in the above examples varied from 1.2 (Example III) to 7.5 (Example II) parts by weight on 100 parts of the resin actually used in the molding step. If the composition is utilized in the process set forth in the examples then the lubricant may be incorporated in the filler system initially contained in the mold. If it is incorporated in this manner then a slight bit of solubility in the resinous binder may even be tolerated. There are a number of other methods which may be used. For instance, tiny droplets of a lubricating liquid may be encapsulated in an inert material and added to the filler system or to the binder system. In either case, the scratch masking effect would be substantially the same as heretofore described.

I claim:

In a sand filled resinous coating composition for a masonry building unit wherein said resin is selected from the group consisting of (*a*) the condensation product of propylene glycol and dipropylene glycol with phthalic anhydride and maleic anhydride and (*b*) the condensation product of ethylene glycol and diethylene glycol with phthalic anhydride, maleic anhydride, and adipic acid, the improvement which comprises: an insoluble mineral oil therein in a scratch masking amount in the range of 1.2 to 7.5 parts by weight per 100 parts of said resin, said oil having a specific gravity between 0.7 and 0.9 at 60° F., and a viscosity between 35 and 5,000 Saybolt Universal seconds at room temperature.

References Cited in the file of this patent

UNITED STATES PATENTS

| | | |
|---|---|---|
| 1,244,777 | Rogers | Oct. 30, 1917 |
| 2,298,066 | Patnode | Oct. 6, 1942 |
| 2,523,065 | Sage | Sept. 19, 1950 |
| 2,541,838 | Shardlow | Feb. 13, 1951 |
| 2,640,038 | Wilder | May 26, 1953 |
| 2,675,325 | Dill | Apr. 13, 1954 |
| 2,751,775 | Sergovic | June 26, 1956 |
| 2,752,638 | Anspon | July 3, 1956 |
| 2,768,149 | Millar | Oct. 23, 1956 |
| 2,814,836 | Russell | Dec. 3, 1957 |
| 2,820,717 | Newman et al. | Jan. 21, 1958 |
| 2,861,011 | Asbeck et al. | Nov. 18, 1958 |
| 2,938,007 | Savage | May 24, 1960 |